Aug. 16, 1966 R. LAWRENCE III 3,266,170

HARDWARE AND SHIPPING CONTAINER

Filed Feb. 6, 1964

INVENTOR.
ROBERT LAWRENCE, III.
BY James B. Lyles
ATTORNEY

United States Patent Office 3,266,170
Patented August 16, 1966

3,266,170
HARDWARE AND SHIPPING CONTAINER
Robert Lawrence III, Hollywood, Fla., assignor to Heinicke Instruments Co., Hollywood, Fla., a corporation of Florida
Filed Feb. 6, 1964, Ser. No. 343,034
2 Claims. (Cl. 34—90)

This invention relates to a shipping container and a hardware container for use in connection with apparatus shown in my copending application Serial No. 343,032, filed February 6, 1964.

The invention contemplates a shipping container of generally L-shape, having a filter and a blower for circulating filtered air from the container and through a hardware container into which has been fixed or mounted an article of hardware that has first been thoroughly cleaned in the invention described in my copending application above identified and whereby an article of hardware may be transported from its point of cleaning to its point of use without contamination The invention contemplates a shipping container having a filter and a blower and a hardware container fitted upon and sealed over the filter and whereby the hardware container and the hardware supported therein is maintained free of contamination throughout its passage from the cleaning apparatus to the point of use.

The invention further comprises a modified form of shipping container that comprises a rectangular receptacle open at one end and subsequently covered by a filter after the hardware has been cleaned.

Novel features of construction and operation of the device will be more clearly apparent during the course of the following description, reference being had to the accompanying drawings wherein has been illustrated a preferred form of the device and wherein like characters of reference are employed to denote like parts throughout the several figures.

Figure 1:
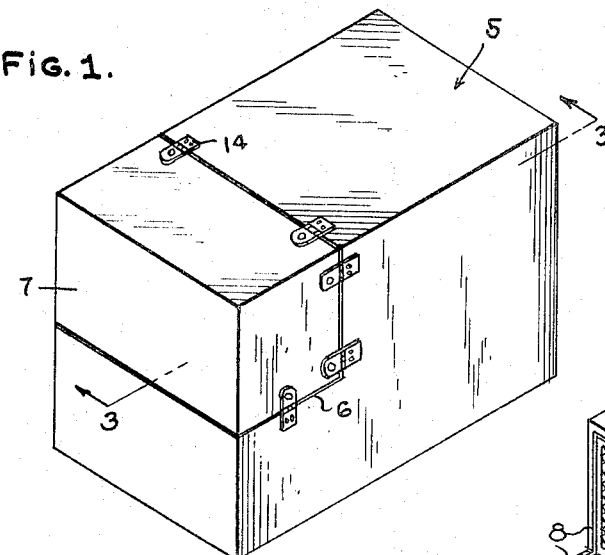
FIGURE 1 is a perspective view of a shipping container and a hardware container mounted thereon.

Referring specifically to the drawings there has been illustrated a shipping container as a whole by the numeral 5. The shipping container 5 is stepped at one end as indicated at 6 for the mounting reception of a hardware container 7. The step 6 is provided with a compressible gasket 8 that extends entirely around the step and the vertical wall of the step is defined by a filter 9. Also mounted within the container 5 is a circulating blower 10. The blower 10 may be substituted by a gas bottle housing circulating an uncontaminated gas through the filter and through the hardware container and back to the chamber carrying the blower or the gas bottle. The hardware container carries the hardware indicated in dotted lines at 11 and the hardware may be supported in any desirable manner by brackets 12. The hardware container is open upon one side to overlie the filter 9 and is slotted upon its bottom as indicated at 13 to permit the flow of air from the filter over and across the hardware and down through the slot 13 and through a corresponding slot 13' formed in the top wall of the step and then to the blower, such maintaining the hardware in a positive uncontaminated condition throughout its movement from the cleaning device to its point of use.

The hardware container may be positively connected to the shipping container by latch devices 14 so as to maintain a full contact with the gasket 8.

It will be apparent, that after the hardware has been thoroughly cleaned and assembled, it is placed within the hardware container and then connected to the shipping container by the latches 14 and the blower then actuated and maintained in actuation throughout the travel from the cleaning device to the point of use. The shipping container may be formed of any desirable material subject to normal handling and has a relatively long life since, when the hardware is removed at the point of use, the device may be again transported to the cleaning apparatus.

Figure 5:
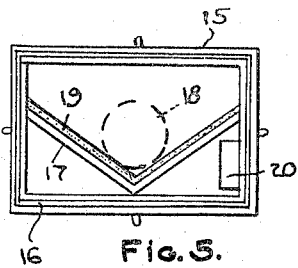
FIGURE 5 is an end view of the container of FIGURE 4 and with the filter being removed.
Figure 2:
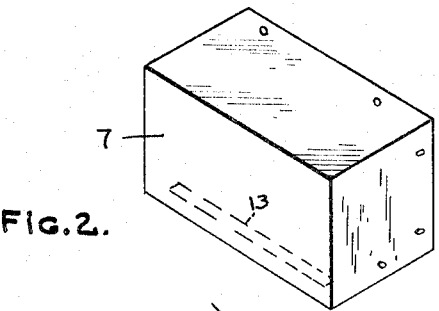
FIGURE 2 is a composite perspective view showing the shipping container and the hardware container for mounting thereof.
Figure 4:
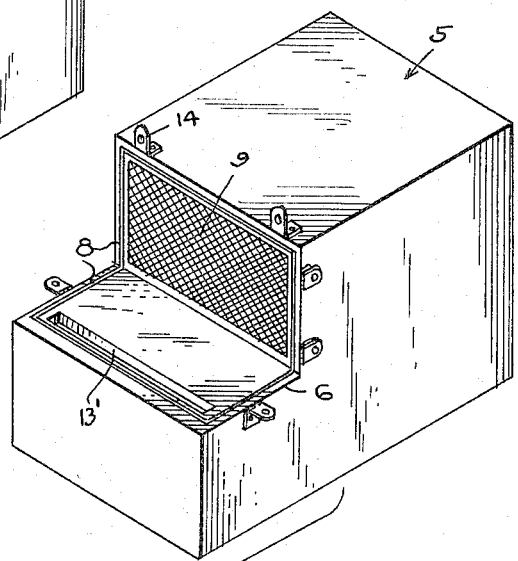
FIGURE 4 is a perspective view of a modified form of shipping container and associated filter cover.

Referring now to FIGURES 4 and 5 there has been illustrated a modified form of shipping container such adapted to support an uncontaminated article of hardware to be transported for short distances. The container embodies a rectangular housing 15, open at one end, as shown. The container 15 at its open end is provided with a compressible gasket 16 that extends entirely around the opening of the container. Fitted within the container 15 and anchored against movement is a supporting cradle 17 for the hardware article indicated in dotted lines in FIGURE 5 at 18. The cradle 17 is generally V-shaped and its side is covered by a cushion liner 19. Also fitted within the container 15 and preferably attached to one side wall thereof is a silica gel packet 20 which in normal use, is adapted to absorb moisture that might have a tendency to collect in the container.

Figure 3:
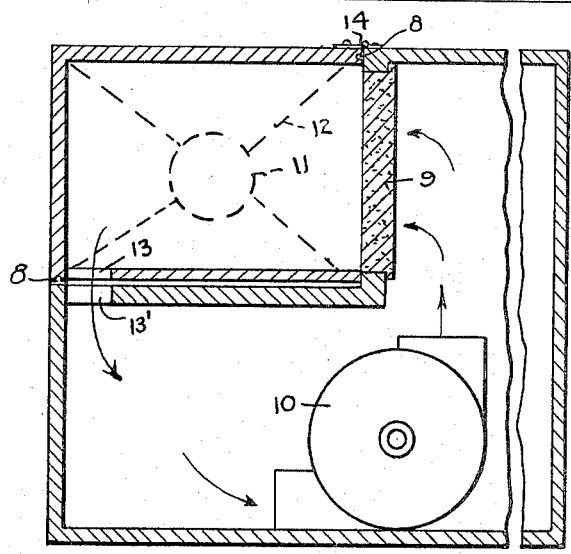
FIGURE 3 is a longitudinal section taken substantially on line 3—3 of FIGURE 1, showing the containers in assembled relation.

Fitted over the open end of the container 15 is a generally rectangular frame 21, corresponding to the opening of the container 15. The frame 21 carries a filter element 22 and the frame and the filter constitute a closure for the opening of the container 15. The frame 21 is fixedly attached to the open end of the container 15 and held in compressive engagement with the gasket 16 by latch devices 23 of any desirable configuration. This form of the invention does not require a circulating blower, such as that illustrated in the first form of the invention and shown in FIGURE 3 since the first form of the invention with the blower is adapted to transport the cleaned articles of hardware relatively long distances, while the device of FIGURES 4 and 5 are employed to support a cleaned article of hardware 18 for a relatively small distance.

The devices are extremely simple, strong, durable and most effective for maintaining articles in an uncontaminated condition that are to be transported from a cleaning device to a point of use.

It is to be understood that the invention is not limited to the precise construction shown, but that changes are contemplated as readily fall within the spirit of the invention as shall be determined by the scope of the subjoined claims.

I claim:

1. A shipping and hardware container of the character described, that comprises a housing that is generally L-shaped to form a step at one end, the stepped portion having a vertical wall and a horizontal wall, the vertical wall and the horizontal wall being marginally grooved to receive a compressible gasket, the vertical wall being defined by a filter and the horizontal wall being provided with a slot opening into the housing, a hardware container having fitment upon the step and conforming to the step to be flush with the top, sides and end of the housing, means for mounting an article of hardware in the container, the container being open upon one side and overlying the filter, the container also being slotted upon its bottom and communicating with the slot of the horizontal wall and means in the housing for creating a flow of filtered air over the hardware and means for holding the container against the gasket.

2. The combination of a shipping and hardware container, that comprises a shipping housing for the support of a hardware container, the housing being stepped at one end for providing a horizontal wall for the support of the hardware container and a vertical wall comprising a filter, the hardware container being formed hollow and open upon one side to overlie the filter, a bottom of the hardware container being slotted to communicate with a corresponding slot formed in the horizontal wall, means for supporting an article of hardware in the hardware container, the article of hardware having been previously cleaned to remove contamination, an air circulating blower in the housing for circulating filtered air through the hardware container and over the article of hardware and back to the housing through the slots, the hardware container being removably held upon the step and an air seal between the housing and the hardware container.

References Cited by the Examiner
UNITED STATES PATENTS

| | | | |
|---|---|---|---|
| 1,847,256 | 3/1932 | Nielsen | 34—90 |
| 2,065,895 | 12/1936 | Jandat | 21—93 X |
| 2,082,380 | 6/1937 | Capra | 34—90 |
| 2,225,817 | 12/1940 | Arnold | 21—93 |
| 2,229,559 | 1/1941 | Fox | 34—90 |
| 2,269,319 | 1/1942 | Reynolds | 312—31 |
| 2,428,861 | 10/1947 | Waring | 312—31 |
| 2,524,162 | 10/1950 | Chavannes | 312—31 |
| 2,623,301 | 12/1952 | Weiskopf | 34—202 X |

FREDERICK L. MATTESON, Jr., *Primary Examiner.*

CHANCELLOR E. HARRIS, *Examiner.*

A. FRANKEL, C. R. REMKE, *Assistant Examiners.*